Figure 3:
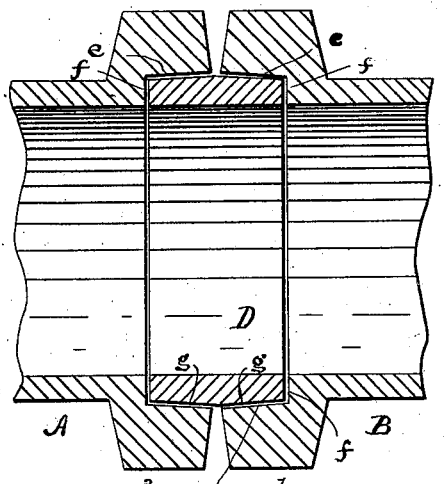

No. 712,047. Patented Oct. 28, 1902.
M. DEAN.
JOINT FOR PIPES, FITTINGS, OR OTHER CONNECTIONS.
(Application filed Apr. 19, 1902.)
(No Model.)

WITNESSES:

INVENTOR
Mark Dean
BY
W. P. Preble Jr
his ATTORNEY.

UNITED STATES PATENT OFFICE.

MARK DEAN, OF BOSTON, MASSACHUSETTS, ASSIGNOR TO CENTRAL FOUNDRY COMPANY, OF NEW YORK, N. Y.

JOINT FOR PIPES, FITTINGS, OR OTHER CONNECTIONS.

SPECIFICATION forming part of Letters Patent No. 712,047, dated October 28, 1902.

Application filed April 19, 1902. Serial No. 103,728. (No model.)

*To all whom it may concern:*

Be it known that I, MARK DEAN, a citizen of the United States, and a resident of Boston, county of Suffolk, Commonwealth of Massachusetts, have invented certain new and useful Improvements in Joints for Pipes, Fittings, or other Connections, of which the following is a specification.

The object of my invention is to provide a new joint for pipes, fittings, valves, or other connections whereby washers, packing, and interlocking or screw-threaded parts are dispensed with and a perfect joint obtained of such character that the parts may be more readily coupled and uncoupled than heretofore. The joint is also much simpler in construction and cheaper than usual. Another great advantage is that without the use of flexible material my new joint may be so constructed as to allow a considerable amount of play. To accomplish these results, I form the joining surfaces longitudinally of the pipe instead of at the ends, as heretofore. It is not necessary in my method that the ends of the pipes or other connections should actually come in contact with each other at their outer edges. The joining surfaces produced on the pipe or other fittings near the end are designed to press against joining surfaces formed upon a nipple, which may be entirely separate from both connections, in which case it serves as a push-nipple, or may be integral with one of the fittings. In the former case the interior surface of each fitting near the end has a joining surface, and the nipple has two joining surfaces, one adapted to mate with each fitting. These two nipple-surfaces may be quite unlike each other, as one may be a straight taper while the other is convex or concave, or one may be convex while the other is concave. When both surfaces are a straight taper, little, if any, play is allowed; but by making one half of the joint tapered both as to the nipple and the fitting and the other half concavo-convex the latter half becomes a sort of ball-and-socket joint, which allows all needed play without in any way interfering with the tightness of the joint. When the nipple is secured permanently or made a part of one of the fittings, there is of course only one pair of joining surfaces.

In both forms of joint the ends of the pipes, fittings, or other articles, whether flanged or not, are provided with two or more lugs pierced to receive suitable bolts, by which the fittings may be drawn together with such pressure as to force the joining surfaces on the interior of the fittings into close and effective contact with those of the nipple presented to them. This effective contact preferably takes place before the outer ends of the fittings can make contact with each other.

My invention consists, therefore, of a joint for pipes, fittings, and other connections composed of two pipe ends, which are recessed at their outer end, the interior wall of the recess being inclined to the axis of the pipe, a separate nipple provided with correspondingly-inclined surfaces at its end and being of greater length than the combined depth of the two recesses, so that when the pipe ends are drawn together the surface of the nipple makes effective contact with the wall of the recess before reaching the bottom of the recess, and bolts or other suitable means for drawing the pipe ends together, so as to clamp them against the nipple.

In the accompanying drawings I have shown my invention as applied to a push-nipple where the joining surfaces are a straight taper, that being the simplest form.

Figure 1:
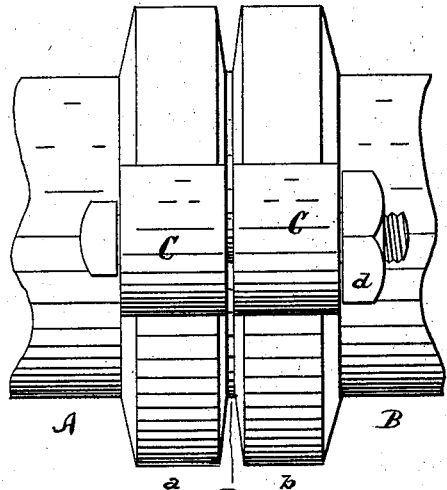
Figure 2:
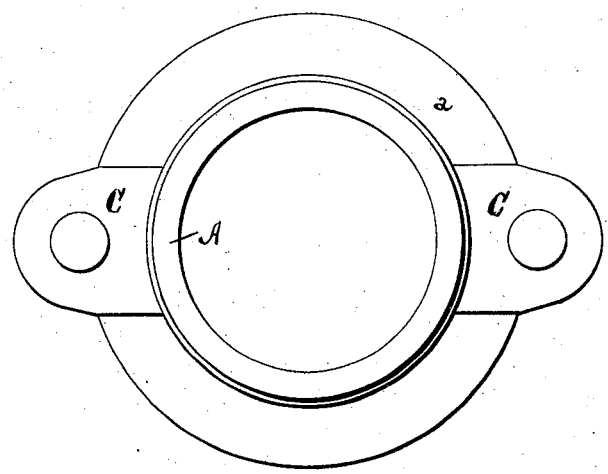

Figure 1 is a side elevation; Fig. 2, an end elevation. Fig. 3 is a longitudinal section of Fig. 1.

Same letters indicate similar parts in the different figures.

A B represent the meeting ends of two pipes or other fittings which are to be coupled together. Each is provided with a flange *a b*. It is not necessary to grind the surface of these flanges or otherwise prepare them in any way, as they are not intended to come together. At two or more places around the pipe perforated lugs C C are provided with the usual threaded nut *d* and would serve to draw the two pipes together until their flanges met were they free to do so. The inner surface of the pipe is cut away to make a joining surface *e e* and preferably recessed to a depth corresponding to the thickness of the nipple and forming the shoulders *f f*.

The joint is made by means of the nipple

D, which is of annular form, the inner diameter of which is preferably the same as that of the fittings to be joined, as in that way when the joint is made the joint offers no obstruction to the flow through the pipe and affords no lodging-place for any grease or dirt. The outer periphery of the nipple is provided with two tapered joining surfaces $g\ g$, which may be smooth, but are preferably a little rough. These two joining surfaces correspond to those already described as being formed on the interior of the pipe.

By making the depth of the nipple slightly in excess of the added depths of the recessed ends of the fittings it is evident that as the fittings are drawn together by the screw-bolts a joint is made, when the parts assume the positions shown in Figs. 1 and 3. The various joining surfaces have been brought into and are held in perfect contact; but the two ends of the pipe or other fitting do not touch each other.

As before stated, when the joining surfaces are a straight taper, as shown, the joint made is a rigid one; but by making the joining surface in the recessed end of one of the fittings concave or convex and the corresponding joining surface of the nipple convex or concave that half of the joint assumes a ball-and-socket character, and the fitting can be allowed considerable play. If both halves of the joint are made in this way, the amount of play is correspondingly increased. Though described and shown as a push-nipple, the principle is the same if the nipple is made an integral part of one of the fittings.

I claim—

A joint for pipes, fittings or other connections which consists of two pipe ends, each having a recess at its outer end, the interior wall of which is inclined to the axis of the pipe, a separate nipple provided with correspondingly-inclined surfaces at its ends whereby when drawn together the surface of the nipple makes effective contact with the wall of the recess before its end reaches the bottom of the recess, and means whereby said pipe ends are clamped against said nipple, the depth of each recess being greater than the length of the adjacent engaging surface of the nipple.

MARK DEAN.

Witnesses:
W. P. PREBLE, Jr.,
RAE BATTERSBY.